US012768817B2

(12) United States Patent
Van Den Bossche

(10) Patent No.: US 12,768,817 B2
(45) Date of Patent: Oct. 20, 2026

(54) PIECE HOLDER AND SUPPORT SYSTEM FOR IMPACT EXCITATION MEASUREMENTS

(71) Applicant: GRINDOSONIC BV, Leuven (BE)

(72) Inventor: Alex Van Den Bossche, Neerijse (BE)

(73) Assignee: GRINDOSONIC BV, Leuven (BE)

( * ) Notice: Subject to any disclaimer, the term of this patent is extended or adjusted under 35 U.S.C. 154(b) by 252 days.

(21) Appl. No.: 18/835,164

(22) PCT Filed: Feb. 14, 2023

(86) PCT No.: PCT/EP2023/053642
§ 371 (c)(1),
(2) Date: Aug. 1, 2024

(87) PCT Pub. No.: WO2023/152399
PCT Pub. Date: Aug. 17, 2023

(65) Prior Publication Data

US 2025/0155411 A1 May 15, 2025

(30) Foreign Application Priority Data

Feb. 14, 2022 (EP) .................................... 22156669

(51) Int. Cl.
*G01N 29/04* (2006.01)
*G01N 29/22* (2006.01)

(52) U.S. Cl.
CPC ......... *G01N 29/045* (2013.01); *G01N 29/223* (2013.01)

(58) Field of Classification Search
CPC ............... G01N 29/223; G01N 29/045; G01N 29/4436; G01N 7/08; G01N 2291/015;
(Continued)

(56) References Cited

U.S. PATENT DOCUMENTS 5,144,838 A * 9/1992 Tsuboi ................. G01N 29/045 702/56
6,347,542 B1 2/2002 Larsson et al.
(Continued)

FOREIGN PATENT DOCUMENTS

CN 110586941 A * 12/2019 ............ B33Y 50/02
EP 3309544 A1 4/2018
(Continued)

OTHER PUBLICATIONS

Machine translation of CN 110586941 (Year: 2019).*
(Continued)

*Primary Examiner* — Nathaniel J Kolb
(74) *Attorney, Agent, or Firm* — Workman Nydegger

(57) ABSTRACT

An impact excitation (IE) measurement system is for measuring the vibrational response of a solid piece to an impulse impact, and comprises: an impactor; a sensor for obtaining a vibrational response of the solid piece to the impact; a support system for supporting the solid piece during providing the impact and obtaining the vibrational response; a positioning table comprising: a piece holder configured to receive the solid piece in a predetermined holder position with respect to the piece holder, and an actuator operably connected to the piece holder and configured to: transfer the piece holder with a solid piece in the predetermined holder position to the support system; place the solid piece on the support system in a predetermined support position, and displace the piece holder such that the solid piece is supported solely by the support system during providing the impact and obtaining the vibrational response.

15 Claims, 3 Drawing Sheets

(58) Field of Classification Search
CPC ....... G01N 2291/014; G01N 2291/023; G01N 2291/0231; G01N 2291/0289; G01N 2291/044
See application file for complete search history.

(56) References Cited

U.S. PATENT DOCUMENTS

| | | | | |
|---|---|---|---|---|
| 2010/0064810 | A1* | 3/2010 | Giudiceandrea | G01N 33/46 73/602 |
| 2019/0234908 | A1 | 8/2019 | Meile et al. | |
| 2019/0285588 | A1* | 9/2019 | Enamito | G01N 29/045 |
| 2020/0057030 | A1 | 2/2020 | Hartwig et al. | |
| 2020/0363375 | A1* | 11/2020 | Abushanab | G01N 29/48 |
| 2022/0244156 | A1* | 8/2022 | Van Den Bossche | G01N 29/4436 |

FOREIGN PATENT DOCUMENTS

| | | | | |
|---|---|---|---|---|
| EP | 3658868 A1 | | 6/2020 | |
| WO | WO-9801737 A1 | * | 1/1998 | G01N 29/045 |
| WO | WO-2020153848 A1 | * | 7/2020 | G01G 19/40 |
| WO | 2020254698 A1 | | 12/2020 | |

OTHER PUBLICATIONS

Extended European Search Report from corresponding EP Application No. 22156669.8, Aug. 23, 2022.

International Preliminary Report on Patentability from corresponding PCT Application No. PCT/EP2023/053642, Jan. 30, 2024.

International Search Report from corresponding PCT Application No. PCT/EP2023/053642, Jun. 15, 2023.

Taheri, Hossein, "Nondestructive Evaluation and in-situ Monitoring for Metal Additive Manufacturing", Graduate Theses and Dissertations Iowa State University, ProQuest LLC, As Early as Jan. 1, 2018, 162 pages.

Huang, Sung-Rung et al. "Time Domain Doppler Estimators of the Amplitude of Vibrating Targets", Journal of the Accoustical Society of America, vol. 91(2), Feb. 1, 1992, pp. 965-974.

Tapson, J., "High Precision, Short Range Ultrasonic Sensing by Means of Resonance Mode-locking", Ultrasonics, vol. 33, No. 6, Nov. 1, 1995, pp. 441-444.

Kazys, R. et al., "Ultrasonic Technique for Vibration Measurements", Proceedings of the 15th World Conference on Non-Destructive Testing, Oct. 15-21, 2000, 4 pages. Retrieved from https://www.ndt.net/article/wcndt00/papers/idn246/idn246.htm.

* cited by examiner

PIECE HOLDER AND SUPPORT SYSTEM FOR IMPACT EXCITATION MEASUREMENTS

TECHNICAL FIELD

The present invention pertains to the field of non-destructive impact excitation measurements of solid pieces whereby information on the solid piece is obtained by providing an impulse impact to the solid piece and record and analyse the vibrational response of the solid piece. The present invention is particularly useful for non-destructively and quantitatively assessing the quality of 3D-printed solid pieces.

BACKGROUND

Additive manufacturing (AM), also called three-dimensional or 3D printing, is a process which has gained a lot of momentum in recent years. It allows construction of a three-dimensional object from a CAD model or a digital 3D model. Hereby, material can be deposited, joined or solidified under control conditions to create a three-dimensional object, with material being added together, such as liquid molecules or powder grains being fused together, typically layer by layer. The precision, repeatability, and material range of 3D printing have increased to the point that some 3D printing processes are considered viable as an industrial-production technology. One of the key advantages of 3D printing is the ability to produce very complex shapes or geometries that would be otherwise impossible to construct by hand, including hollow parts or parts with internal truss structures to reduce weight.

In many cases it is necessary to ensure that 3D printed pieces meet required quality standards and that anomalies can be detected and characterized. It is thus important to have metrology tools for mechanical property evaluation and for appropriate anomaly detection, quality control, and monitoring.

Knowledge of when various types of deviations of quantities from the expected values appear, will increase the potential for early detection of significant flaws in additively manufactured parts and offers the potential opportunity for in-process intervention and to hence decrease the time and cost of repair or rework. Because the AM process involves incremental deposition of material, it gives unique opportunities to monitor the material quality as it is deposited. To meet this need there are a variety of sensing methods and signals which can be measured. Among the available measurement modalities, acoustic-based methods have the advantage of potentially providing real-time, continuous in-service monitoring of manufacturing processes at relatively low cost.

The Ph.D. thesis of Taheri, Hossein, "Nondestructive evaluation and in-situ monitoring for metal additive manufacturing" (2018). Graduate Theses and Dissertations Iowa State University, 16675, discloses a manner of monitoring an AM method in-situ. A proof-of-concept demonstration for acoustic measurements used for monitoring both machine and material state is demonstrated. The analyses have been performed on temporal and spectral features extracted from the acoustic signals. These features are commonly related to defect formation, and acoustic noise that is generated and can potentially characterize the process. A novel application of signal processing tools is used for identification of temporal and spectral features in the acoustic signals. This method concerns obtaining acoustic measurements during the AM process, and trying to extract information therefrom. It seems to involve an intricate analysis, which may depend highly on the exact manufacturing method and the material used.

Document US 2019/234908 A1 discloses an object analysis comprising measuring a frequency-dependent natural oscillation behavior of the object by dynamically-mechanically exciting the object in a defined frequency range (f) by means of generating a body oscillation by applying a test signal, and detecting a body oscillation generated in the object on account of the exciting. Moreover, the method involves simulating a frequency-dependent natural oscillation behavior for the object by generating a virtual digital representation of the object, and carrying out a finite element analysis on the basis of the virtual representation comprising dynamically exciting, in a simulated manner, the virtual representation into a virtual frequency range for generating a virtual body oscillation, calculating the virtual body oscillation generated in the object on account of the exciting in a simulated manner, and deriving an object state on the basis of a comparison of the measured natural oscillation behavior and the simulated frequency-dependent natural oscillation behavior.

Document EP3309544A1 discloses a method for in-process monitoring of a 3D manufacturing apparatus or quality control of a 3D manufactured structure. The method includes a generating step that generates an acoustic wave in the 3D manufactured structure. A receiving step receives the acoustic wave with a microphone array. An analyzing step analyzes a frequency spectrum of the acoustic wave. A determining step determines if the frequency spectrum indicates a defect in the 3D manufactured structure.

Document US 2020/057030 A1 discloses a system and method for the non-destructive testing of additively manufactured parts. An input mechanism excites with an excitation force (e.g., a vibration) an additive manufacturing build structure, which includes a part on a build platform, to induce a dynamic response in the part. An output mechanism (e.g., a non-contact transducer) senses the induced dynamic response in the part. A processor determines and examines the relationship between the response and excitation to identify an indication of a defect in the part, and communicates an alert if the indication is identified. The processor may compare the phase, magnitude, coherence, or time delay of the relationship to a reference relationship and/or may compare the modal frequency or the modal damping to a reference to identify a deviation greater than a pre-established threshold.

Document EP3658868A1 discloses an apparatus for analyzing a mechanical vibratory response of a solid material sample, the apparatus comprising: an array of impactors arranged to impart an impact on respective well-defined points on the surface of said solid material sample; a sensor configured to capture said mechanical vibratory response as a time-varying signal, subsequent to an impact of said at least one impactor; and processing means configured to analyze said time-varying signal to determine the frequencies and decay constants of sinusoids making up said time-varying signal. The invention also pertains to a corresponding method of characterizing a solid material sample.

Document WO2020254698A1 discloses a method for acoustically measuring material properties of a test piece at high temperatures, comprising the steps of: a. heating the test piece to within a testing temperature range; b. performing a background measurement within said testing temperature range by capturing a vibrational signal from the test piece within a calibration period, thereby obtaining a noise signal; c. performing an acoustic measurement on said test piece within said testing temperature range and within a testing period by: c1. imparting a vibrational excitation onto the test piece; c2. capturing a vibrational signal of the test piece within the testing period, thereby obtaining a vibrational response signal to said vibrational excitation, and d. obtaining the material properties of the test piece by analysing the vibrational response signal, thereby taking into account the noise signal. The present invention also concerns a system for acoustically measuring material properties of a test piece at high temperatures.

Both of the latter prior art documents in name of the current applicant are concerned with methods and apparatuses for performing the impact excitation (IE) measurements. The IE technique basically consists of providing an impact to a work piece and obtaining and analysing the vibrational response signal. This signal is also referred to as an acoustic response signal. The response signal can be captured via a number of ways, including by using a microphone, a piezoelectric displacement sensor and/or a laser interferometer.

Using IE measurements, work pieces can be non-destructively tested for assessing the quality of the work piece in a quantitative way. This can be used for work pieces of all types of materials: metals, alloys, polymers, ceramics, or any combination thereof. IE measurements, and in particular the present invention, seem particularly useful for characterizing 3D-printed work pieces, also called additively manufactured work pieces. In such work pieces, the additive manufacturing (AM) process may lead to inhomogeneities with respect to the quality of the work piece, i.e. some regions of the work piece may be of lesser quality than other regions.

The quality of a work piece, and in particular a 3D printed work piece, can be characterized by measuring the porosity of the work piece. Typically a higher porosity is indicative of more defects, and can be indicative of a lower quality work piece. Porosity can be measured using tomography, e.g. X-ray micro-computed tomography (CT). X-ray micro-CT has the advantage of recreating a full 3D model of a scanned object, allowing a non-destructive inspection of internal features or defects. However, X-ray micro-CT is an expensive and time-consuming measuring method. Furthermore, the inventors have found that X-ray micro-CT cannot resolve all types of quality-decreasing structural properties. For instance, micro-CT does not have a good sensitivity for detecting microcracks. Hence, the present invention aims to provide a method wherein one can obtain a quality assessment of an AM work piece with respect to both porosity and microcracks in a single measurement or at least with a single measurement setup.

The inventors have found that microcracks lead to internal friction, which in turn leads to an increased attenuation of vibrations, and in particular of vibrations at or around the eigenfrequencies of the solid piece. Consequently, a quantitative assessment of the microcracks present in the solid piece can be made by computing one or more damping parameters for one or several eigenfrequencies. One possible way to compute the damping parameters is to quantify the shape of the eigenfrequency peaks in the frequency spectrum of the vibrational response.

However, when trying to obtain the damping parameters using an impact excitation technique, the inventors have found that prior art techniques lack accuracy when measuring these damping parameters for different solid pieces. More in particular, comparing the results for the damping parameters obtained for different solid pieces may be improved upon. Also, the inventors have found that reproducibility of the extracted damping parameters is not always high.

The present invention aims to overcome the above mentioned and other problems. The present invention hereto provides an improved method and system for performing IE measurements on a solid piece, preferably a 3D-printed solid piece. The improved method and system allow to obtain very accurate results for the characteristics of the solid piece which can be extracted from the vibrational response, in particular eigenfrequencies and damping parameters. The obtained characteristics are furthermore better comparable across different solid pieces.

SUMMARY OF THE INVENTION

The present invention concerns an impact excitation (IE) measurement system and method for measuring the vibrational response of a solid piece to an impulse impact in an accurate and repeatable manner. The invention is described in the claims, in particular in independent claims . . . . Preferred embodiments of the invention are disclosed in the dependent claims in the present document.

Hence, the present invention concerns an impact excitation (IE) measurement system for measuring the vibrational response of a solid piece to an impulse impact, comprising:

- an impactor, preferably a mechanical impactor, for providing an impact to a solid piece;
- a sensor for obtaining a vibrational response of the solid piece to the impact;
- a support system for supporting the solid piece during providing the impact and obtaining the vibrational response.

The system further comprises a positioning table for positioning the solid piece correctly on the support system. The inventors have found that in order to obtain accurate results for the eigenfrequencies, and especially for the damping parameters of the eigenfrequencies, it is important that the solid piece is positioned in an exact position with respect to the support system. This is important to allow comparison of results between:

- measurements performed on different solid pieces which are made using the same 3D printing process. This allows assessing the accurateness, stability and repeatability of the 3D printing process, as well as the quality consistency of the printing machine and process when comparing same parts printed in the same build;
- different measurements on the same solid piece, e.g. at different times. This allows assessing changes in solid piece which can occur over time, e.g. due to wear and tear, or due to further processing steps on the piece (e.g. a heating procedure).

Putting the solid piece in the exact position is particularly useful when obtaining damping characteristics, such as damping parameters. Measurement of damping parameters is particularly sensitive to external friction. In the present invention, external friction can be minimized by placing the solid piece in the optimal support position. Moreover, by repeatably placing solid pieces in the same support position, any remaining external friction is essentially equal across measurements. Therefor, the positioning table comprises:

- a piece holder configured to receive the solid piece in a predetermined holder position with respect to the piece holder;
- an actuator operably connected to the piece holder and configured to:

transfer the piece holder with a solid piece in said predetermined holder position to the support system;

place the solid piece on the support system in a predetermined support position, and displace the piece holder such that the solid piece is supported solely by the support system during providing the impact and obtaining the vibrational response.

The present invention also concerns such a positioning table.

The present invention also concerns an impact excitation (IE) measurement method for measuring the vibrational response of a solid piece to an impulse impact, comprising the steps of:

a) placing the solid piece in a piece holder in a predetermined holder position with respect to the piece holder;

b) transferring the piece holder with the solid piece in the predetermined holder position to the support system;

c) placing the solid piece on a support system in a predetermined support position;

d) displacing the piece holder such that the solid piece is supported solely by the support system;

e) imparting an impact, preferably a mechanical impact, to the solid piece supported solely by the support system;

f) obtaining a vibrational response of the solid piece to the impact.

Preferably the IE measurement method comprises the further step of:

g) analysing the vibrational response by extracting a set of eigenfrequencies and/or a set of damping parameters.

Further embodiments of the present invention are disclosed further in this document and in the claims.

OVERVIEW OF THE FIGURES

Figure 3A:
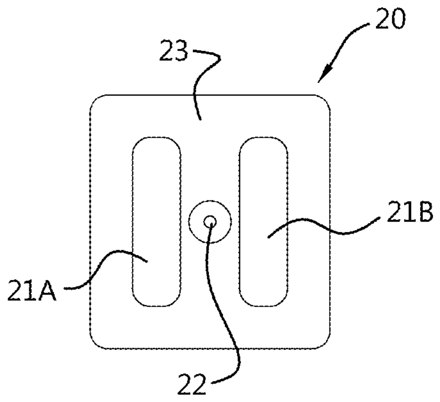
Figure 3B:
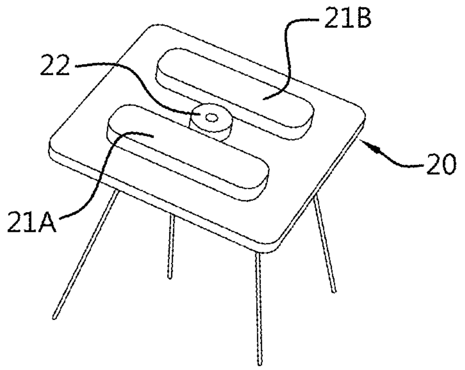

An exemplary supporting system in accordance with the present invention is shown in top view in FIG. 3A and in perspective view in FIG. 3B.

Figure 4A:
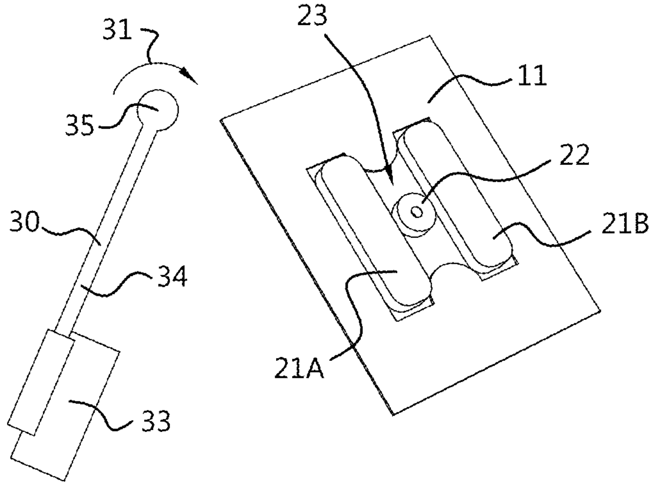
Figure 4B:
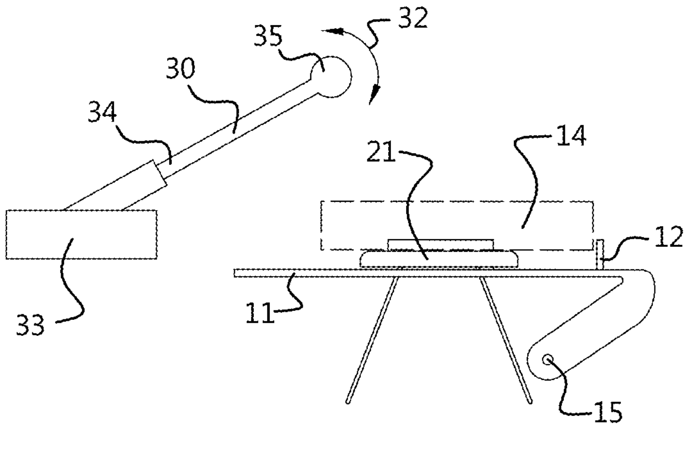

A measurement method according to the present invention is illustrated in FIGS. 4A and 4B.

DETAILED DESCRIPTION OF THE INVENTION

The present invention will now be further explained with reference to the figures, which serve to explain the invention. The figures illustrate exemplary embodiments of the invention.

Figure 1A:
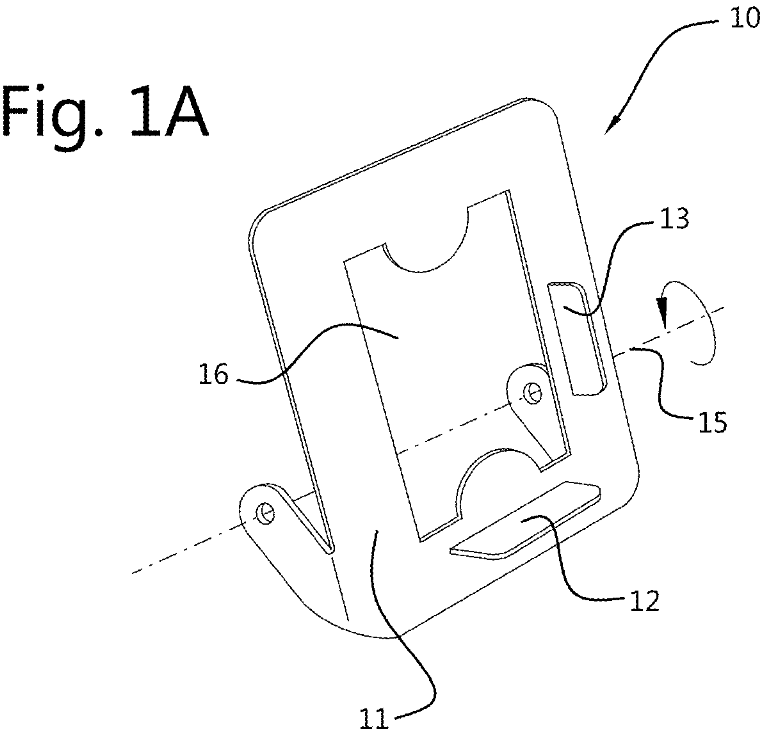
FIGS. 1A and 1B illustrate a positioning table in accordance with the present invention.
Figure 1B:
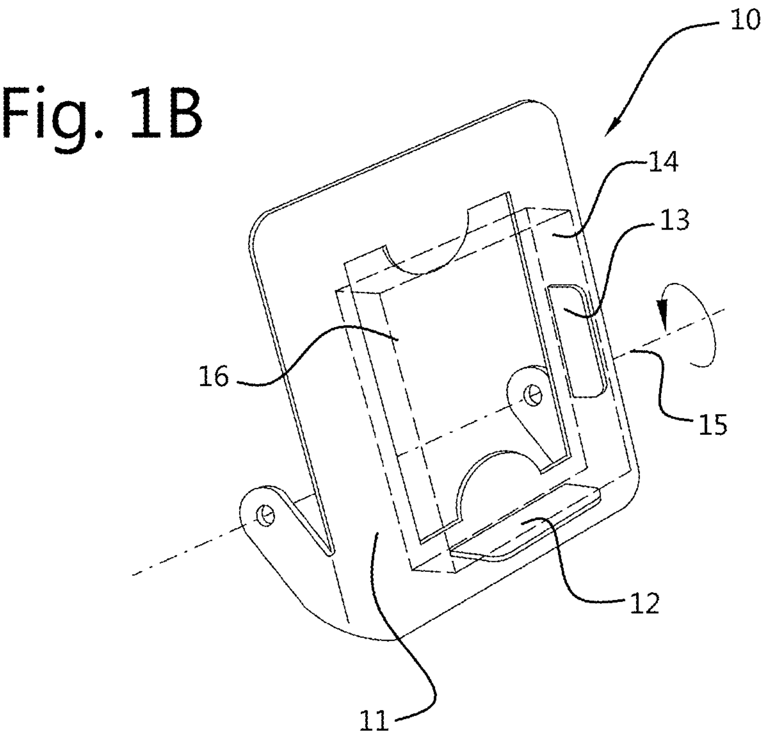

FIGS. 1A and 1B illustrate a positioning table in accordance with the present invention. The table (10) comprises a piece holder comprising an essentially flat surface (11) and a set of positioning flanges (12, 13) which define the predetermined holder position for a solid piece (14). The piece holder is rotatably arranged around a pivot axis (15). The actuator is not shown on the figure, but can preferably a motor, such as an electrical motor, preferably a rotating motor, such as an electrical rotating motor. The actuator is operably connected to the piece holder and is configured to rotate the piece holder around the pivot axis in a manner consistent with the present invention. The piece holder also preferably contains a central hole (16) within the essentially flat surface, which will allow to rotate the piece holder at least partially over the support system, such that the solid piece (14) in de holder position can be gently positioned on top of the support system.

Figure 2A:
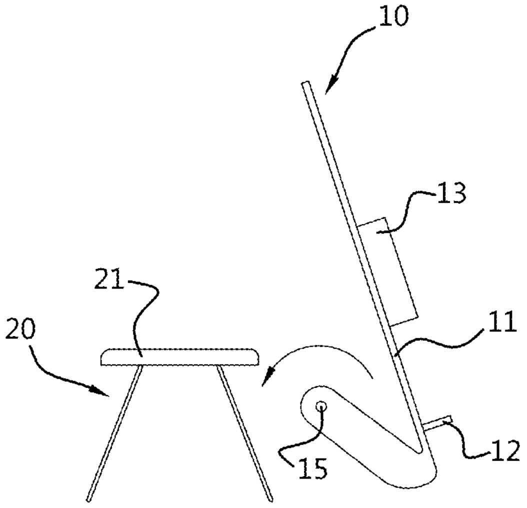
FIGS. 2A, 2B and 2C illustrate the movement of the rotatable piece holder and the transfer of the solid piece to the supporting system from a side view.
Figure 2B:
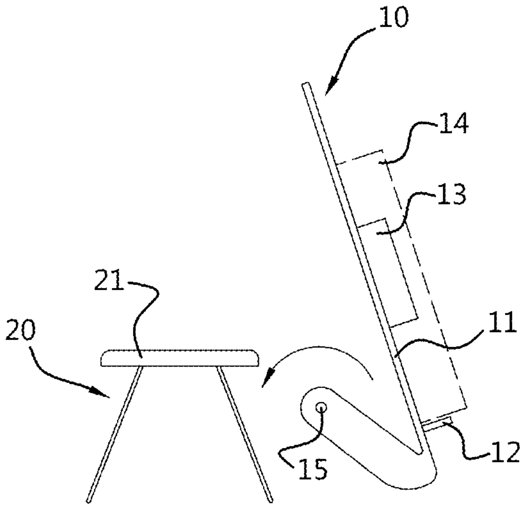
Figure 2C:
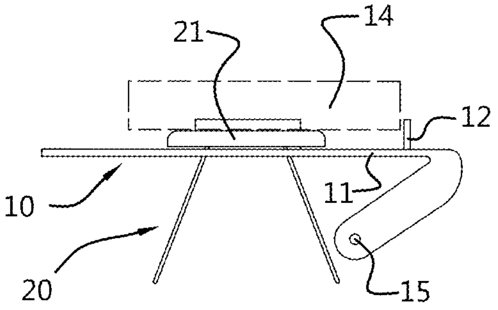

This is better illustrated in FIGS. 2A, 2B and 2C, wherein the movement of the rotatable piece holder (10) and the transfer of the solid piece to the supporting system (20) is shown from a side view. Hereby, a solid piece (14) can be positioned on the piece holder at the predetermined holder position (FIG. 2B) at the beginning of the measurement. The flanges (12, 13) hold the solid piece in this holder position during the transfer. The piece holder is then rotated (counterclockwise in the FIGS. 2A-2B). The central hole in the piece holder is hereby rotated over the top part (21) of the supporting system (20), the result of which is that the solid piece (14) is placed on the supporting system, and in particular on the top part (21) thereof (see FIG. 2C). Preferably the top part comprises a flat bed support comprising an elasticity which is much larger than the elasticity of the solid piece to minimize external friction during the measurement.

The support system comprises a flat bed for supporting a solid test piece within the testing chamber, said bed comprising an elasticity which is substantially larger than the elasticity of the test piece, said bed preferably further comprising a through for allowing the impactor to provide an impact to the test piece from below or for allowing a sensor to obtain the vibrational response from close by. The term “elasticity” of a component refers to the manner in which the component stretches elastically under a stress, whereby a first component is called more elastic than a second component if the first component has a larger relative strain under the same stress than the second component. Hereby the elasticity can be expressed in terms of a ratio (E/o) of a relative strain parameter (¿) divided by a stress parameter (c) for elastic deformations, preferably this ratio being Young’s modulus (E). Preferably the elasticity of the bed is at least 5 times the elasticity of the material of the test piece, more preferably at least 10 times, still more preferably at least 50 times, yet more preferably at least 100 times, still more preferably at least 200 times, even more preferably at least 500 times, yet even more preferably at least 1000 times the elasticity of the material of the test piece. The system and method of the present invention relate to a method for obtaining properties of a test piece by measuring an acoustic response to an impact, and by analysing the acoustic response with respect to resonance frequencies, shifts in resonance frequencies, decay constants of the response at certain frequencies, etc. In the present invention, the presence of a flat bed having an elasticity which is larger than the elasticity of the test piece, is particularly useful to obtain good measurement results for the damping parameters of the test piece, i.e. the relatively high elasticity of the bed, compared to that of the test piece, ensures that the test piece is allowed to vibrate essentially freely, i.e. the vibration being essentially unaffected by the presence of the bed. In fact, the elasticity of the bed ensures that the bed is capable of following the vibrational movement of the test piece.

The piece holder preferably comprises or is made of a plastic material. Plastic allows to easily create a piece holder with a shape and/or with flanges corresponding to the shape and size of the solid piece or solid pieces which are to be tested. Since these solid pieces tend not to be vary large or heavy, a lightweight piece holder is possible, which piece holder thus preferably comprises or is made of a plastic material such a polyethylene, polypropylene, or another polymer material.

An exemplary supporting system in accordance with the present invention is shown in top view in FIG. 3A and in perspective view in FIG. 3B. The supporting system (20) hereby comprises a solid frame (23) and a top part (21) which preferably comprises a set of flat bed supports (21A, 21B), which preferably are made of elastic material, e.g. a foam. A sensor (22) is integrated in the solid frame of the supporting structure in between the flat bed supports. In the shown figure, the predetermined support position is on top of the flat bed supports (21A, 21B) and centralized over the sensor (22).

In embodiments, the sensor may comprise a contact-based sensor such as a piezoelectric sensor, a noncontact-based sensor such as a microphone or a laser vibrometer, or an accelerometer. A noncontact-based sensor is preferred if damping parameters are to be measured. In a preferred embodiment, the acoustic sensor comprises a laser interferometer. A laser interferometer is particularly useful for measurements in vacuum, and allows contactless measurements. Alternatively or additionally, the acoustic sensor may comprise an ultrasonic measurement sensor and/or a time-of-flight sensor and/or a Doppler-based sensor, for instance as described in:

S-R. Huang, R. M. Lerner, K. J. Parker, "Time domain Doppler estimators of the amplitude of vibrating targets", J. Acous. Soc. Am., 91(2), 965-974 (1992);

J. Tapson, "High precision, short range ultrasonic sensing by means of resonance mode-locking", Ultrasonics, 33, 6, 441-444 (1995)), and in R. Kazys, R. Sliteris, L. Mazeika, "Ultrasonic technique for Vibration Measurements", Proceedings of the 15th World Conference on Non-Destructive Testing, 15-21 Oct. 2000 in Rome, https://www.ndt.net/article/wcndt00/papers/idn246/idn246.htm.

The measurement method is illustrated in FIGS. 4A and 4B, for a supporting structure as in FIGS. 3A and 3B and a positioning table as shown in FIGS. 1A-2C. The positioning table is hereby in the position shown in FIG. 2C, whereby the central hole (16) of the positioning table is rotated over the top part (21) of the supporting system, such that the solid piece (14) is supported only by the top parts (21A, 21B). Once, the solid piece is only supported by the top parts, a mechanical impactor (30) is rotated in a first movement (31) over the solid piece (14) as indicated in FIG. 4A. The mechanical impactor (30) comprises an elastic arm (34) and a hammer tip (35) at a distal end of the arm. The mechanical impactor is preferably actuated by an impactor actuator (33) which preferably comprises an electrical motor, preferably a programmable electric motor. Once the impactor is positioned over the solid piece, then in a second movement (32), an impulse impact is provided to the solid piece by an up-and-down movement (32) of the arm (34) and hammer tip (35) as indicated in FIG. 4B. Only the hammer tip impacts on the solid piece. The vibrational response is obtained by the sensor (22), and can be further analyzed by a processing means.

In an embodiment of the invention, the supporting system is fixedly installed, meaning that it does not move during the process of:

a) placing the solid piece in a piece holder in a predetermined holder position with respect to the piece holder;
b) transferring the piece holder with the solid piece in the predetermined holder position to the support system;
c) placing the solid piece on a support system in a predetermined support position;
d) displacing the piece holder such that the solid piece is supported solely by the support system;
e) imparting an impact, preferably a mechanical impact, to the solid piece supported solely by the support system;
f) obtaining a vibrational response of the solid piece to the impact.

The fixed position of the supporting system increases the reproducibility of the measurement.

In a preferred embodiment of the invention, the positioning table (10), is provided with a temperature sensor for measuring the temperature of the test piece. Preferably the piece holder of the positioning table is provided with the temperature sensor. This allows the temperature of the test piece to be measured by direct contact. Preferably, the temperature sensor comprises a thermocouple.

Furthermore, this allows the measurements to be repeated at different temperatures, thereby obtaining a temperature dependence of the eigenfrequencies and/or of the damping parameters. Such temperature dependences may reveal further information on the quality of the solid piece.

Therefore, the support system comprises a bed preferably consisting of a thermally stable elastic material in the shape of a flat mat. The support bedding preferably comprises an open structure. Preferably the bed is composed of a nonwoven material. In a preferred embodiment, the bed comprises or is made of a ceramic material or a glass-like material, such as mullite (SiO2), alumina ($Al_2O_3$) or a combination thereof such as polycrystalline mullite and alumina wool, preferably in a nonwoven structure. The bed may also comprise or be made of a polymer material.

The term "thermally stable material" refers to a material which has a very small thermal expansion over a large temperature interval. Preferably, the material comprises a linear expansion coefficient of at most $25.0\times10^{-6}$ $K^{-1}$, more preferably at most $15.0\times10^{-6}$ $K^{-1}$, yet more preferably at most $10.0\times10^{-6}$ $K^{-1}$, still more preferably at most $8.0\times10^{-6}$ $K^{-1}$, even more preferably at most $6.0\times10^{-6}$ $K^{-1}$, yet even more preferably at most $5.0\times10^{-6}$ $K^{-1}$, still even more preferably at most $4.0\times10^{-6}$ $K^{-1}$, most preferably at most $3.0\times10^{-6}$ $K^{-1}$. Preferably, the materials comprises such low thermal expansion over the full range of the temperature interval over which the measurements are performed.

In an embodiment, the bed comprises a flat mat shape. Preferably, the bed comprises a height between 1 mm and 50 mm, more preferably between 2 mm and 45 mm, still more preferably between 3 mm and 40 mm, yet more preferably between 4 mm and 35 mm, still more preferably between 5 mm and 30 mm, such as 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm or any value therebetween. The heights of the bedding given here are measured at 20° C.

Note that providing the positioning table, and in particular the piece holder, with the temperature sensor allows measuring the temperature of the test piece from the moment it is positioned on the positioning table at least until the moment when the test piece is supported by the support system alone, i.e. from step a) up to step d) of the method according to the present invention, thus allowing measurement of the temperature at any moment or any interval during steps a) to d). The temperature may also be measured after step f), in case the test piece is removed from the supporting position by the positioning table.

Accordingly, in a preferred embodiment of the invention, the IE measurement method comprises the step of measuring the temperature of the test piece. The temperature of the test piece can be measured at any time or during any interval during steps a) up to d), preferably during and/or after performing step a), before, during and/or after performing any of the steps b) and/or c), and/or before and/or during performing step d). Preferably, the temperature of the test piece is monitored during an interval wherein any or any combination of the steps a), b), c) and/or d) are performed, preferably wherein all steps a) to d) are performed.

The analysis may preferably comprise the following steps:

- obtaining a vibrational response of the solid piece to the impact, preferably a vibrational response in the frequency domain;
- extracting a set of eigenfrequencies, and optionally attenuations, from the vibrational response, each of said eigenfrequencies corresponding to a vibrational mode of said solid piece;
- obtaining for at least one vibrational mode:
  - an eigenfrequency shift by comparing one of the set of extracted eigenfrequencies corresponding to said vibrational mode to a reference eigenfrequency value of said vibrational mode and preferably obtaining a porosity value of the solid piece from said eigenfrequency shift, thereby detecting the deviating AM process behaviour.

Preferably hereby, a set of attenuations are also extracted from the vibrational response, each of said attenuations corresponding to an eigenfrequency of said set of eigenfrequencies. These attenuations can be extracted for at least one and preferably each of the eigenfrequencies. Thereby, for at least one eigenfrequency, at least one damping parameter is computed from an attenuation corresponding to said eigenfrequency, thereby obtaining a microcrack quantity value of the solid piece which allows detecting deviating AM process behaviour which is not detected by the eigenfrequency shift alone. Hereby, an attenuation relates to how a certain eigenfrequency echoes after the impact has been provided to the solid piece, and in particular to how long after the impact said eigenfrequency can still be seen in the vibrational response. The attenuation can be extracted from the time domain response of the vibrational response and/or from the frequency domain response of the vibrational response, preferably from the frequency domain response. A damping parameter, also referred to as a damping coefficient, can be computed from the attenuation. Typically, attenuation can be quantified by looking at the eigenfrequency peak in the frequency spectrum of the vibrational response. Preferably, a damping parameter is related to a width of the eigenfrequency peak in the vibrational response, e.g. the width of the eigenfrequency peak at half maximum. Alternatively or additionally, a damping parameter can be related to the shape of the eigenfrequency peak in the vibrational response, e.g. a skew damping parameter and/or a kurtosis parameter.

The inventors have found that the eigenfrequency shift thus obtained relates directly to the porosity of the solid piece, which on its turn relates to the amount of voids comprising a medium-sized and large-sized radius. Further, the inventors have found that the damping parameter of an eigenfrequency is intimately related to the amount of microcracks within the solid piece, which on its turn is related to the durability of the solid piece, i.e. the long-term strength. Note that microcracks are essentially linear in structure, and therefore do not significantly contribute to the porosity of the solid piece. The present invention, however, allows to obtain information on both porosity and microcracks in a single measurement and/or with a single measurement setup, and thus also allows obtaining a quantitative assessment of the quality of the solid piece based on the eigenfrequency shift and the damping parameter. This quantitative assessment also applies to the AM method used to make the solid piece. The quantitative assessment may be preferably made by a scoring algorithm, which computes a score depending on the values of the one or more eigenfrequency shifts and the one or more damping parameters, and optionally dependent on a set of threshold values which preferably are selected to ensure a minimum quality of the solid piece. The analysis is preferably performed by a processing means, which is configured to:

- compute the vibrational response in the frequency domain;
- extracting a set of eigenfrequencies, and optionally attenuations, from the vibrational response, each of said eigenfrequencies corresponding to a vibrational mode of said solid piece;
- obtaining for at least one vibrational mode: an eigenfrequency shift by comparing one of the set of extracted eigenfrequencies corresponding to said vibrational mode to a reference eigenfrequency value of said vibrational mode and preferably obtaining a porosity value of the solid piece from said eigenfrequency shift, thereby detecting the deviating AM process behaviour.

Preferably, the processing means is also configured to obtain a set of attenuations from the vibrational response, each of said attenuations corresponding to an eigenfrequency of said set of eigenfrequencies. These attenuations can be extracted for at least one and preferably each of the eigenfrequencies. Thereby the processing means is configured, for at least one eigenfrequency, to compute at least one damping parameter from an attenuation corresponding to said eigenfrequency, thereby obtaining a microcrack quantity value of the solid piece.

The invention claimed is:

1. An impact excitation (IE) measurement system for measuring a vibrational response of a solid piece to an impulse impact, comprising:

- an impactor for providing the impulse impact to the solid piece;
- a sensor for obtaining the vibrational response of the solid piece to the impulse impact;
- processing means configured to analyze the vibrational response by extracting a set of eigenfrequencies and a set of damping parameters;
- a support system for supporting the solid piece during providing the impulse impact and obtaining the vibrational response;
- a piece holder configured to receive the solid piece in a predetermined holder position with respect to the piece holder;
- an actuator operably connected to the piece holder and configured to:
  - transfer the piece holder with the solid piece in said predetermined holder position to the support system; and
  - place the piece holder and the solid piece on the support system in a predetermined support position such that the solid piece is supported solely by the support system during providing the impulse impact and obtaining the vibrational response
  - wherein the support system comprises a top part which comprises a flatbed support comprising an elasticity which is larger than the elasticity of the solid piece.

2. The IE measurement system according to claim 1, wherein the actuator is configured to, after the vibrational response is obtained, move the piece holder such that the solid piece is positioned in the predetermined holder position, and to displace the piece holder such that the solid piece is removed from the support system.

3. The IE measurement system according to claim 1, wherein the impactor is a mechanical impactor.

4. The IE measurement system according to claim 1, wherein the piece holder comprises an essentially flat surface and a set of positioning flanges which define the predetermined holder position for the solid piece.

5. The IE measurement system according to claim 4, wherein the piece holder comprises a central hole within the essentially flat surface, which central hole allows the flat surface to surround the top part of the support system.

6. The IE measurement system according to claim 1, wherein the piece holder is rotatably arranged around a pivot axis and wherein the actuator is configured to rotate the piece holder around the pivot axis to the support system such that the solid piece is placed on the support system in the predetermined support position.

7. The IE measurement system according to claim 1, wherein the actuator comprises a motor.

8. The IE measurement system according to claim 1, wherein the support system is provided with a temperature sensor for measuring the temperature of the test piece.

9. The IE measurement system according to claim 1, further comprising the solid piece.

10. The IE measurement system according to claim 9, wherein the solid piece is a 3D printed solid piece.

11. The IE measurement system according to claim 1, wherein the actuator comprises an electric motor.

12. The IE measurement system according to claim 1, wherein the actuator comprises a programmable electric motor.

13. An impact excitation (IE) measurement method for measuring a vibrational response of a solid piece to an impulse impact, comprising the steps of:

a) placing the solid piece in a piece holder in a predetermined holder position with respect to the piece holder;

b) transferring the piece holder with the solid piece in the predetermined holder position to a support system;

c) placing the piece holder and the solid piece on the support system in a predetermined support position such that the solid piece is supported solely by the support system;

d) imparting the impulse impact to the solid piece supported solely by the support system;

e) obtaining the vibrational response of the solid piece to the impulse impact wherein the support system comprises a top part which comprises a flatbed support comprising an elasticity which is larger than the elasticity of the solid piece, the method further comprising the step of:

f) analyzing the vibrational response by extracting a set of eigenfrequencies and a set of damping parameters.

14. The IE measurement method according to claim 13, wherein the solid piece is a 3D printed solid piece.

15. The IE measurement method according to claim 13, comprising the step of measuring the temperature of the test piece.

* * * * *